United States Patent
Mokrzycki

(12) 
(10) Patent No.: US 6,749,746 B2
(45) Date of Patent: Jun. 15, 2004

(54) CATCH BASIN TRAP WITH FILTER

(75) Inventor: John T. Mokrzycki, Barrie (CA)

(73) Assignee: Munro Concrete Products Ltd., Ontario (CA)

( * ) Notice: Subject to any disclaimer, the term of this patent is extended or adjusted under 35 U.S.C. 154(b) by 0 days.

(21) Appl. No.: 10/054,927

(22) Filed: Jan. 25, 2002

(65) Prior Publication Data

US 2003/0141230 A1 Jul. 31, 2003

(51) Int. Cl.⁷ ................................................ E03F 5/04
(52) U.S. Cl. ....................... 210/163; 210/170; 210/309; 210/452; 210/463; 210/532.1; 210/538; 404/4
(58) Field of Search ................................ 210/162, 163, 210/164, 170, 299, 308, 309, 455, 459, 460, 470, 452, 454, 463, 532.1, 538; 404/4, 5

(56) References Cited

U.S. PATENT DOCUMENTS

| | | | |
|---|---|---|---|
| 142,671 A | | 9/1873 | Boschen |
| RE5,920 E | | 6/1874 | Meyer |
| 459,440 A | | 9/1891 | Coleman |
| 1,035,480 A | | 8/1912 | Schodde |
| 1,654,247 A | * | 12/1927 | Egan ........................... 210/164 |
| 1,654,803 A | | 1/1928 | Griffith |
| 1,693,977 A | * | 12/1928 | Egan ........................... 210/164 |
| 2,263,259 A | * | 11/1941 | Boosey ......................... 210/164 |
| 2,550,400 A | | 4/1951 | Boosey |
| 2,550,401 A | | 4/1951 | Boosey |
| 2,745,510 A | * | 5/1956 | Holtyrun ..................... 210/299 |
| 3,282,430 A | * | 11/1966 | Kinño ........................ 210/162 |
| 4,261,823 A | * | 4/1981 | Gallagher et al. .......... 210/164 |
| 4,935,132 A | * | 6/1990 | Schaier ........................ 210/163 |
| 5,372,714 A | | 12/1994 | Logue, Jr. |
| 5,525,215 A | * | 6/1996 | Marchionda ................ 210/162 |
| 5,575,925 A | | 11/1996 | Logue, Jr. |
| 5,683,577 A | * | 11/1997 | Nurse, Jr. ................... 210/170 |
| 5,820,762 A | | 10/1998 | Bamer et al. |

(List continued on next page.)

OTHER PUBLICATIONS

IPEX brochure entitled "ICD Inlet Control Device for Stormwater Management" published 1996.

Primary Examiner—Christopher Upton
(74) Attorney, Agent, or Firm—Clark & Brody

(57) ABSTRACT

An assembly for mounting in a side wall opening of a catch basin side wall and convertible into a trap for reducing the amount of matter being carried out of the catch basin by drainage water exiting the catch basin. The assembly includes a first trap member having a first wall and an outlet opening formed in the first wall and a second trap member releasably and sealingly engageable with the first trap member. The second trap member has a second wall spaced from the first wall when so attached. The assembly further includes a filter assembly releasably attachable to one of the first and second trap members, and having a filter member being made to capture matter entrained in drainage water. When the assembly is assembled, mounted in the side wall opening, and converted into a trap by providing the inlet opening in the second wall at a position below the outlet opening, there is defined a water flow path extending from the catch basin interior, through the inlet opening and then through the outlet opening, and the filter member is positioned across the water flow path to capture matter entrained in drainage water flowing along the path. The inlet opening is sized, shaped and configured to restrict water flow through the assembly to promote settlement of matter in the catch basin. Also provided is a method of capturing matter entrained in drainage water exiting a catch basin including mounting a filter member releasably to the catch basin side wall downstream of the side wall opening, the filter member being made to remove matter from drainage water flowing through the filter member.

20 Claims, 6 Drawing Sheets

U.S. PATENT DOCUMENTS 5,849,181 A      12/1998  Monteith
5,853,581 A  *  12/1998  Rayborn et al. ............ 210/470
5,980,740 A  *  11/1999  Harms et al. ............... 210/163
6,126,817 A      10/2000  Duran et al.
6,132,603 A  *  10/2000  Mokrzycki .................. 210/163
6,358,405 B1 *   3/2002  Leahy ........................ 210/170

* cited by examiner

CATCH BASIN TRAP WITH FILTER

FIELD OF THE INVENTION

The present invention relates to traps for mounting in a side wall opening of a catch basin side wall.

BACKGROUND OF THE INVENTION

Catch basins are large concrete structures buried in the ground and used to collect drainage water. They typically have an opening in one side wall to which may be coupled an outflow or outlet pipe of a drainage system. A trap is often provided at the opening in order to prevent floating pollutants, such as gas, oil, leaves and branches, from entering the outlet pipe and possibly plugging the pipe. Such traps may also provide a water "plug" for preventing sewer gases from entering the catch basin from the outlet pipe. This reduces offensive odors in the area of the catch basin.

A problem with prior art traps is that they are not particularly effective in filtering or removing matter such as dirt, debris and pollutants from drainage water entering the catch basin. Examples of matter include cigarette butts, fallen leaves, woods, plastic, bottles, trash, sand, and silt, bacteria, heavy metals, nutrients, and hydrocarbons, such as oil and grease. The matter is often carried with the drainage water out of the catch basin and enters lakes and river beds, which can be harmful to aquatic life. Furthermore, outlet pipes downstream of the catch basin may become clogged resulting in costly clean-up operations.

Another problem with conventional traps is that they tend to permit water to flow at too great a rate through the catch basins during periods of heavy rainfall. In some municipalities, drainage water from catch basins combine with sewage water to be collectively treated at sewage treatment facilities. When water entering the sewage treatment plant exceeds its capacity, excess water may go untreated and be discharged into rivers and lakes, resulting in environmental damage.

U.S. Pat. No. 6,126,817 issued Oct. 3, 2000 to Duran discloses traps having flow regulating means which promote the settlement of entrained particles in catch basins. However, the traps are relatively complicated in their design which adds to manufacturing costs. Moreover, the traps are not constructed to remove finer particles such as silt or clay or non-settling pollutants such as hydrocarbons.

The present invention provides a trap which is intended to remedy the above problems and has additional advantages, as will become apparent below.

SUMMARY OF THE INVENTION

In accordance with a first aspect of the invention, there is provided an assembly for mounting in a side wall opening of a catch basin side wall and convertible into a trap for reducing the amount of matter being carried out of the catch basin by drainage water exiting the catch basin, said assembly being sealingly attachable across said side wall opening and comprising:

a first trap member having a first wall and an outlet opening formed in said first wall, said first trap member being sealingly attachable to an outlet pipe with said outlet opening in communication with the interior of the pipe;

a second trap member releasably and sealingly engageable with said first trap member and having a second wall spaced from said first wall when so attached; and a filter assembly releasably attachable to one of said first and second trap members, said filter assembly having a filter member made to capture matter entrained in drainage water;

wherein, when the assembly is assembled, mounted in said side wall opening, and converted into a trap by providing said inlet opening in said second wall at a position below said outlet opening, there is defined a water flow path extending from the catch basin interior, through said inlet opening and then through said outlet opening, and said filter member is positioned across said water flow path to capture matter entrained in drainage water flowing along said path.

The invention also provides an assembly according to the first aspect converted into a trap. When so converted, the second wall has an inlet opening for communicating with the interior of the catch basin. The inlet opening may be sized, shaped and configured to restrict water flow through the assembly to promote settlement of matter in the catch basin.

The second wall may be provided with cutting guides for use in cutting the inlet opening.

In accordance with a second aspect, there is provided a method of capturing matter entrained in drainage water exiting from a catch basin into an outlet pipe through a side wall opening in the catch basin. The method comprises providing a trap that includes an outer trap member having a first wall and an outlet opening formed in the first wall, an inner trap member releasably engaged with the outer trap member and having a second wall defining an inlet opening, and a filter member having an open end and an opposite closed end. The trap is mounted in the side wall opening so that the outer trap member is attached to the outlet pipe and the open end of the filter member is coupled releasably to an inner surface of the outer trap member downstream of the side wall opening. Again, the filter member is made to capture matter from drainage water flowing through the filter member.

Traps according to the present invention have several advantages. First, positioning the filter assembly near the side wall opening of the catch basin, allows the catch basin to be easily cleaned using a conventional vacuum truck. The hose of a vacuum truck can be simply inserted into the catch basin to suck up sediment and debris, without fear of damaging the filter assembly. In contrast, conventional filter assemblies are often mounted near the inlet of the catch basin or within the catch basin itself. In these situations, the filter may be damaged by the hose of a vacuum truck during cleaning. Also, in some cases, the catch basin must be redesigned to accommodate the filter assembly. Furthermore, cleaning such conventional filter assemblies often involves lifting the assemblies out of the catch basin from above, a process which can be time consuming and cumbersome.

Second, by restricting the flow of water through the trap, more particulates are retained in the catch basin as mentioned above. This prevents the downstream clogging of outlet and sewer pipes, and the deposit of sediment in water ways or water bodies such as rivers and lakes.

Third, the present assembly allows for much flexibility, being adaptable after installation to suit site specific needs. The filter assembly and inner trap member may be removed after the trap has been installed to provide a catch basin which functions as though no trap were present. This is useful in situations in which a trap is needed initially but not later. For example, during construction, the inner trap component and filter may be required to keep the large amount of exposed sediment from entering the drainage or sewer system. However, when construction is complete, a catch basin without a trap, or with a trap but without a filter assembly, may be adequate in removing smaller amounts of sediment entering the catch basin. Conversely, the filter assembly and inner trap member may be added to the outer trap member long after the outer trap member has been mounted in the side wall of a catch basin. This is useful in situations in which no trap is needed initially but is needed later. For example, a gas station could be built in an existing community near a catch basin with no trap. With the outer trap member already installed in the catch basin side wall, one could simply mount the inner trap member to the outer trap member during construction of the gas station to provide a trap suitable for catching large sediments resulting from construction. A filter assembly suitable for capturing particulate matter could also be mounted to catch finer sediments. Later, when the gas station is operational, the filter assembly may be replaced with another filter assembly having a hydrocarbon filter to filter gasoline and oil from drainage water entering the trap from the gas station.

A fourth arguable advantage is that the catch basin will "back up" when the filter is clogged thereby providing a visual indicator that the filter needs replacement. This is in contrast with some conventional filter assemblies which provide overflow openings to allow water to flow into the drainage system when the filter is clogged, thus carrying dirt, debris and other pollutants with it.

BRIEF DESCRIPTION OF THE DRAWINGS

To facilitate a better understanding of the invention, a preferred embodiment will now be described with reference to the drawings in which:

FIG. 4a is a partial view of one of a plurality of bayonet engagement mechanisms of the trap;

Figure 4:
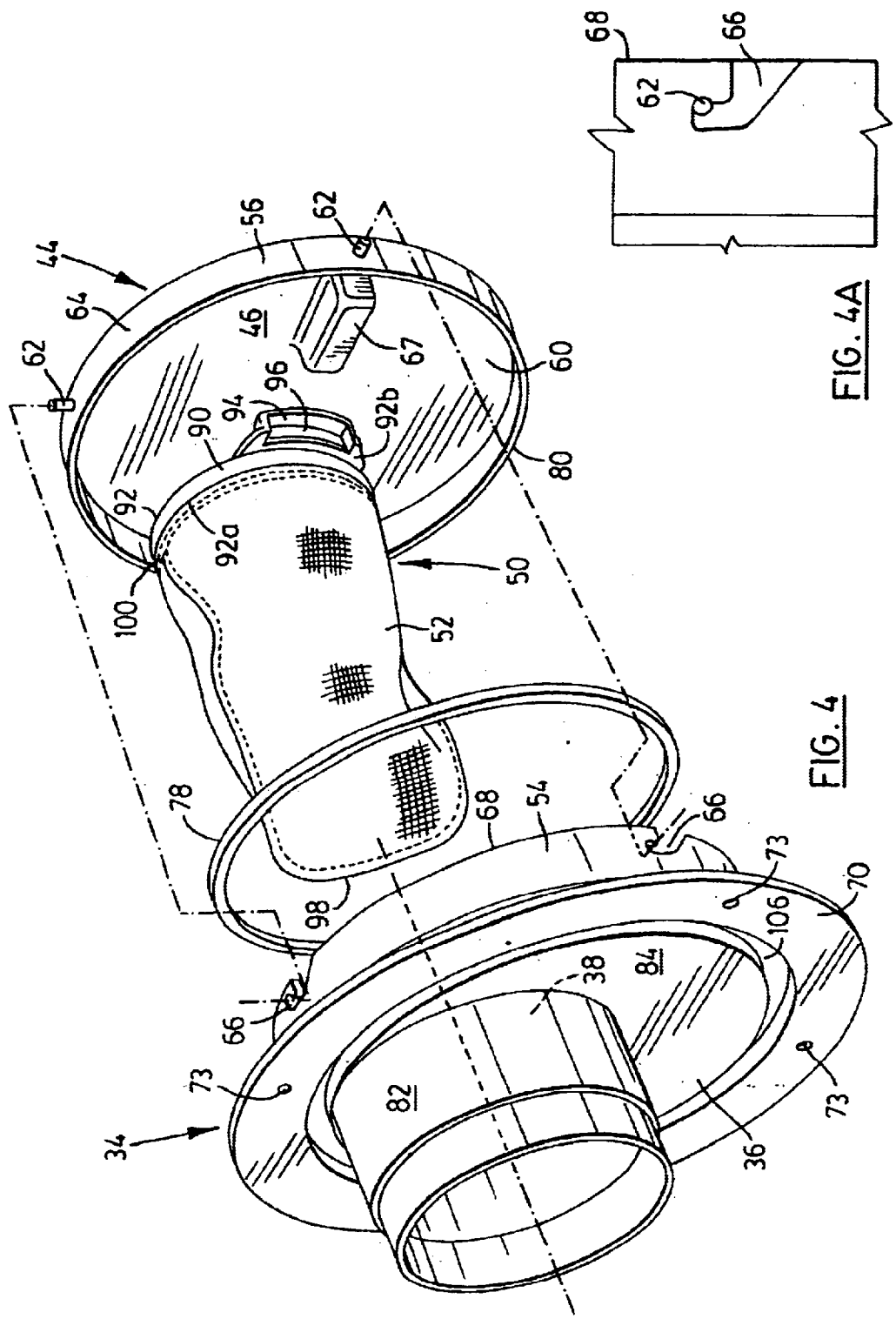
FIG. 4 is a perspective exploded view of the trap showing inner and outer trap members, a filter assembly, and a sealing ring.

Except for FIGS. 4 and 4a, the drawings are not drawn to scale. They show the trap enlarged relative to the catch basin to better see details of the trap.

DETAILED DESCRIPTION OF THE PREFERRED EMBODIMENTS

Figure 1:
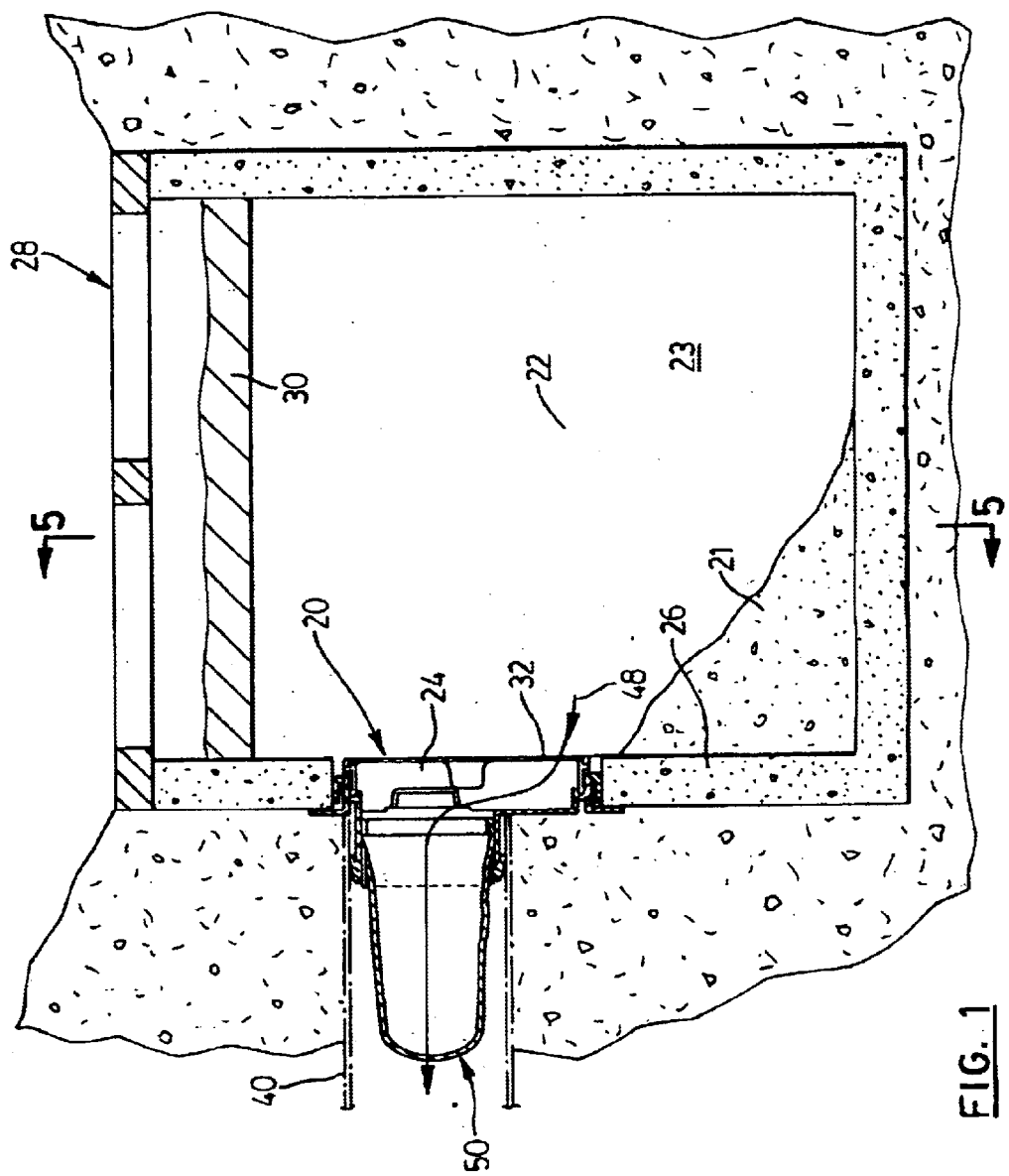
FIG. 1 is a partially simplified side sectional view of a trap according to the preferred embodiment of the invention mounted in a side wall opening of a catch basin side wall.
Figure 2:
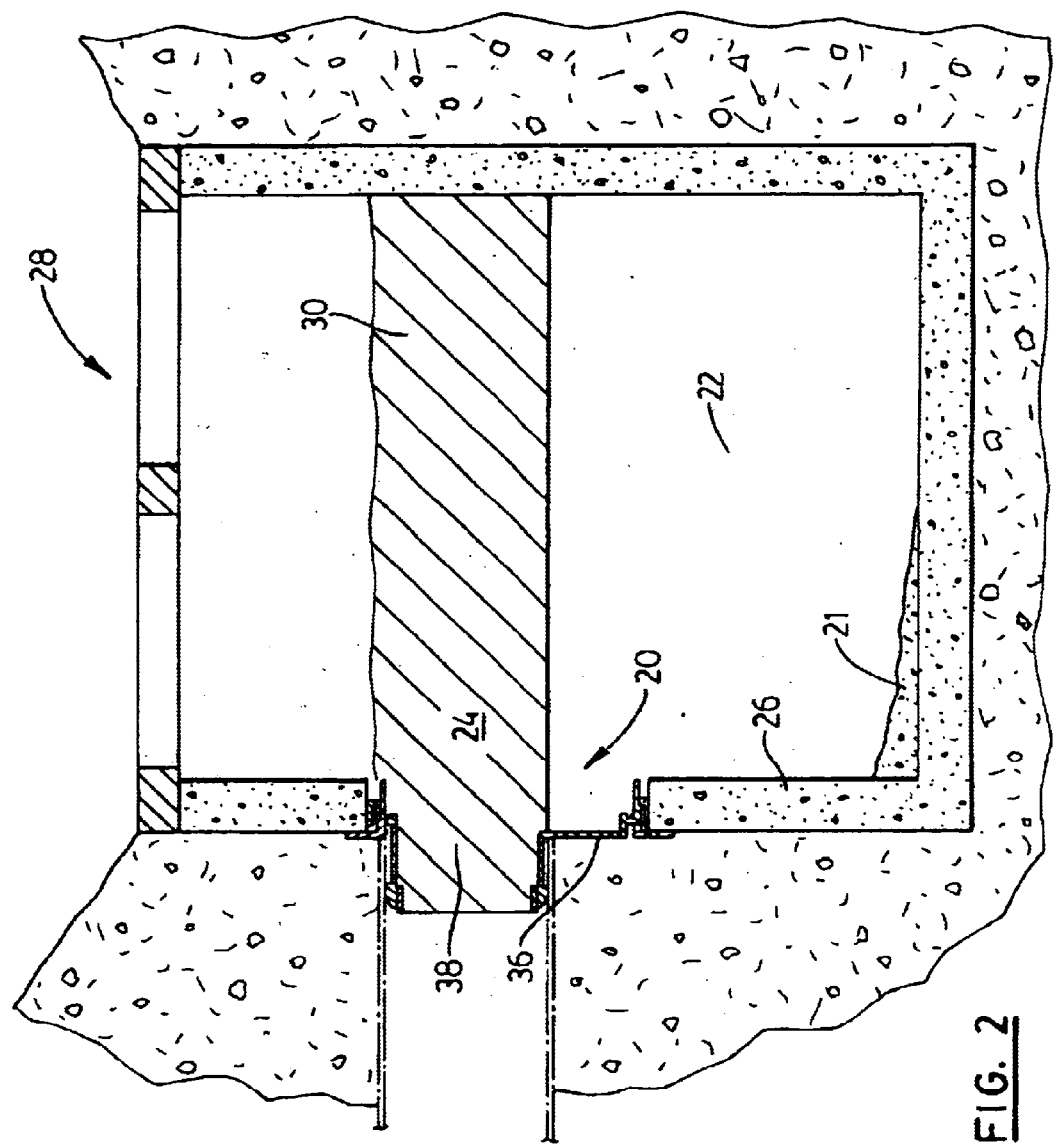
FIG. 2 is a view similar to the view of FIG. 1 showing the trap with an inner trap member and filter assembly thereof removed.
Figure 5:
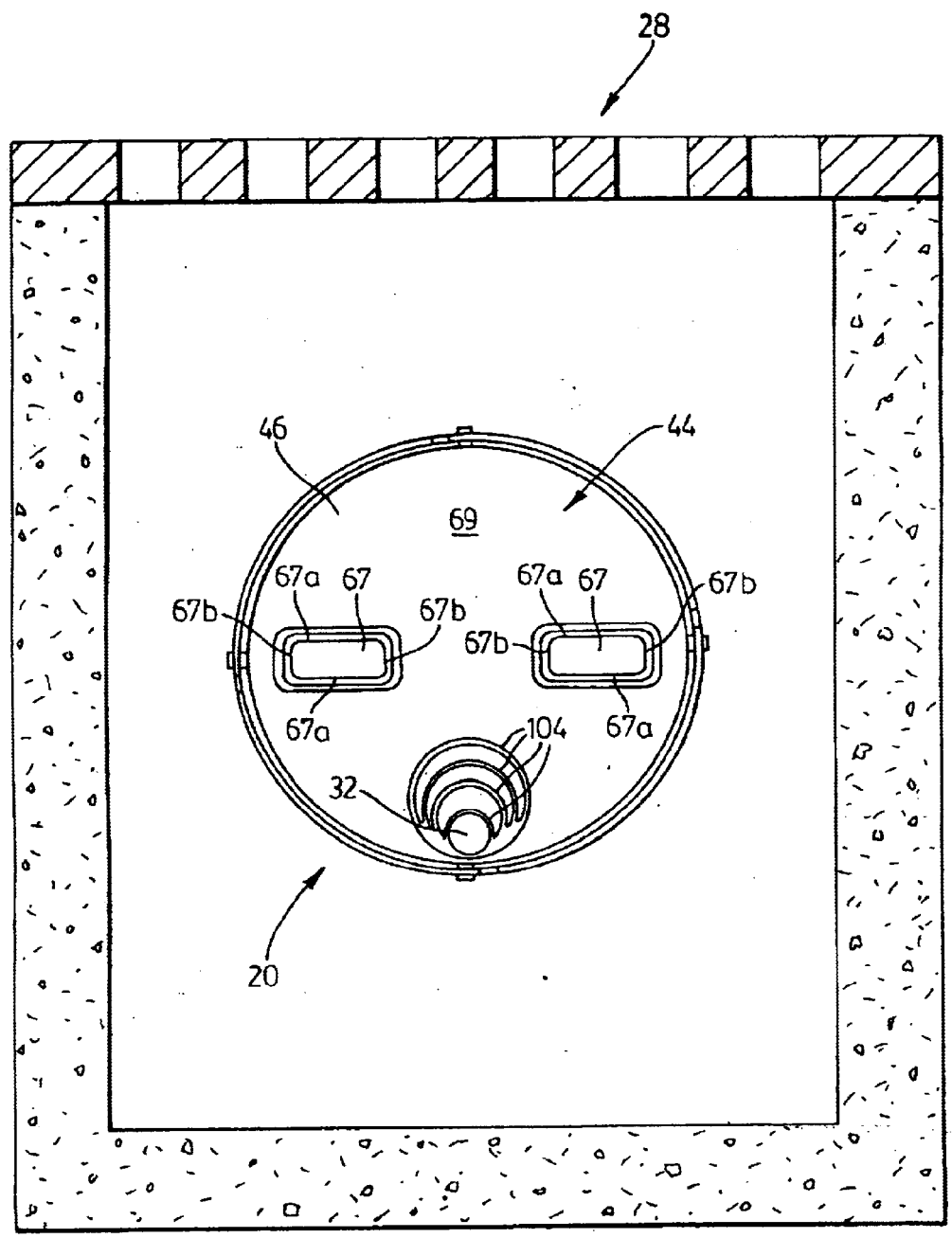
FIG. 5 is a sectional view taken generally along line 5—5 of FIG. 1.

FIGS. 1 and 2 are partially simplified drawings illustrating the effects of a trap 20 according to the present invention. The trap 20 facilitates the setting out of solid matter 21 such as sediment and debris carried by incoming drainage water 22 and reduces the amount of such matter 21 being carried out through a circular side well opening 24 of a side wall 28 of a catch basin 28. FIG. 2 shows the trap 20 with components removed so that drainage water may flow unrestricted out of the catch basin 28 as though no trap was present. As shown in FIGS. 1 and 5, the catch basin forms a water containing chamber 23.

Referring to FIG. 1, the trap 20 has a circular inlet opening 32 which is sized and shaped to significantly restrict water flow through the trap 20. As can be seen with reference to FIGS. 1 and 2, restricting water flow has the effect of raising the water level in the catch basin 28. Thus, water entering the catch basin 28 will travel a shorter distance and at a lower velocity upon impact with the collected water which results in reduced turbulence 30 in the collected water. This in turn promotes settlement of matter in the catch basin 28 and prevents previously settled matter from becoming resuspended and carried out of the catch basin 28 with drainage water flowing through the trap 20.

Figure 3:
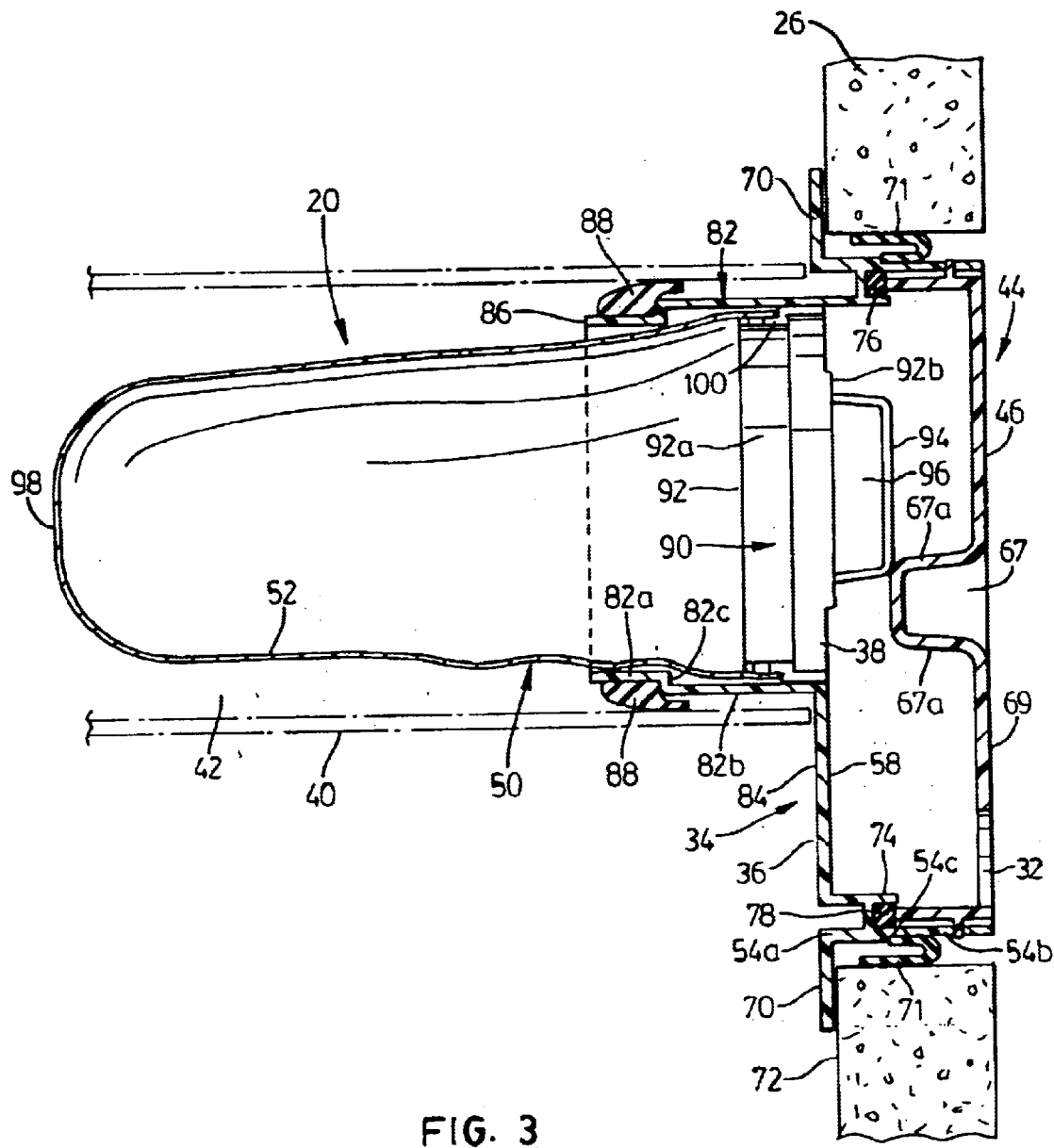
FIG. 3 is a view similar to the view of FIG. 1, enlarged to show the details of the trap.

Referring mainly to FIG. 3, but with reference also to the other Figures, the trap 20 is circular in end view (FIG. 5) and is sealingly attachable across the circular side wall opening 24, which has been bored into the concrete side wall 26 using a coring machine, after the wall has been cast. The trap 20 includes a first trap member in the form of outer trap member 34 having a generally planar and circular first wall 36 and a circular outlet opening 38 (best seen in FIG. 2) formed in the first wall 36. The outer trap member 34 is sealingly attachable to an outlet pipe 40 (shown in chain dotted outline) with the outlet opening 38 in communication with the interior 42 of the pipe 40. The trap 20 also includes a second trap member in the form of an inner trap member 44 which is releasably and sealingly engageable with the outer trap member 34, as will be further explained below. The inner trap member 44 has a circular, generally planar second wall 46 defining the circular inlet opening 32 for communicating with the interior of the catch basin 28.

To significantly restrict water flow through the trap 20, thereby raising the water level in the catch basin 28 and reducing turbulence, the inlet opening 32 has a diameter of 5.1 cm (i.e. a cross-sectional area of about 20.4 cm$^2$). In this preferred embodiment, the inlet opening 32 may be enlarged to a diameter of 12.7 cm (i.e. a cross-sectional area of about 126.7 cm$^2$) as will be described further below.

When the trap is assembled and mounted in the side wall opening 24, as shown in FIG. 3, the inlet opening 32 is spaced from and disposed below the outlet opening 38 to define a water flow path 48 (see FIG. 1) extending from the catch basin interior, through the inlet opening 32 and then through the outlet opening 38 and a filter assembly 50, and into the pipe 40.

The filter assembly 50 is releasably attachable to the outer trap member 34, in a manner as will be further described below, and serves to capture particulate matter too fine to settle out in the catch basin. Such matter is captured by a filter member in the form of a filter bag 52 disposed downstream of the outlet opening 38 and positioned across the water flow path 48. The filter bag 52 is made of interwoven polyester fibre combined with a woven polyester scrim having an effective pore size of about 110 microns to filter particles such as sand.

Referring now mainly to FIG. 4, the outer and inner trap members 34, 44 have respective first and second cylindrical connecting walls in the form of outer and inner connecting walls 54, 56, respectively. The outer and inner connecting walls 54, 56 are integrally formed with and extend perpendicularly away from inner sides of respective first and second walls 36, 46. The inner connecting wall 56 of the inner trap member 44 is sized and positioned to extend from the perimeter of the second wall 46, and is dimensioned to fit inside the outer connecting wall 54 of the outer trap member 34. Furthermore, the inner connecting wall 56 has four pins 62 equi-angularly spaced and extending radially outwardly from an outer surface 64 thereof. The outer connecting wall 54 has an equal number of equi-angularly-spaced curved slots 66 formed in a free end 68 thereof for receiving the pins 62 in a bayonet fit as more clearly shown in FIG. 4A which shows one pin and slot engagement arrangement. Thus, the trap members 34, 44 can be releasably secured together by inserting the pins 62 into the slots 66 and rotating the inner trap member 44 towards and clockwise relative to the outer trap member 34 until the pins 62 reach an inward limit of the slots 66, as shown in FIG. 4A.

Figure 6:
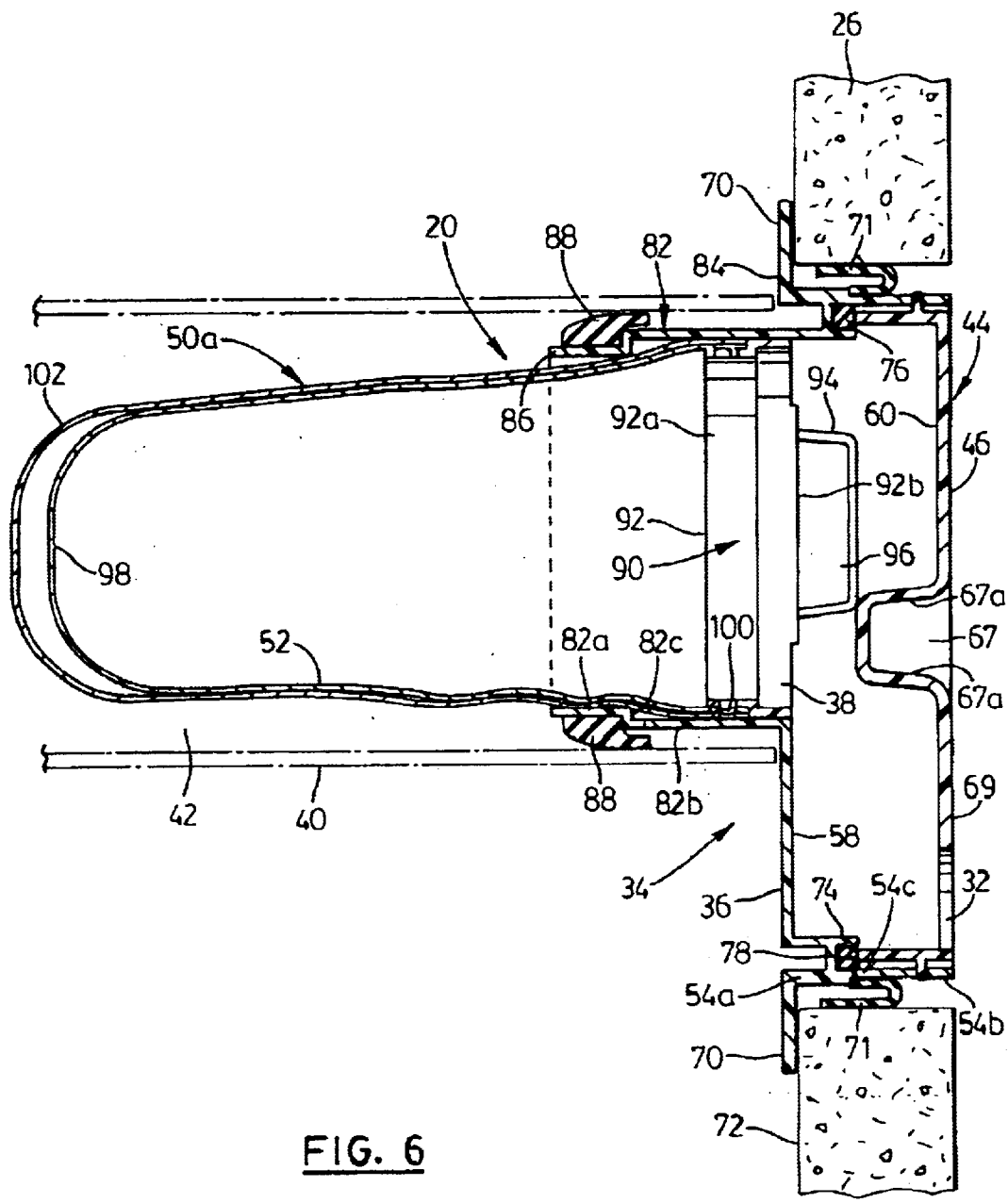
FIG. 6 is a view similar to the view of FIG. 3 showing the trap having an alternative filter assembly comprising two filter bags.

As best seen with reference to FIGS. 4 and 5, the second wall 46 is indented on an outer surface 69 thereof to provide a pair of grooved rectangular handles 67. Each handle 67 has two pairs of opposed bearing surfaces 67a, 67b extending generally transversely relative to said second wall 46 (FIGS. 3 and 6). The handles 67 permit a user to assemble or disassemble the first and second trap members from outside the catch basin using a suitable implement which would be rigid and comprise an elongated body with one end to be gripped by a user and an opposite end having a pair of spaced rectangular inserts configured to mate with the grooved rectangular handles 67 and bear on the bearing surfaces 67a, 67b. The body must be long enough to permit a user to stand outside of the catch basin and insert the rectangular inserts into the handles 67 to rotate the inner trap member 44 into and out of engagement with the outer trap member 34.

As can be best seen with reference to FIG. 3, the outer trap member 34 has a cylindrical sealing wall 74 integrally formed with and extending perpendicularly away from the inner surface 58 of the first wall 36, and spaced radially inwardly from the outer connecting wall 54 so as to define an annular groove 76 therebetween dimensioned to receive an annular foam sealing member 78 and a free end 80 (see FIG. 4) of the inner connecting wall 56 of the inner trap member 44. Thus, a liquid tight seal may be formed between the inner and outer trap members 44, 34.

The outer connecting wall 54 of the outer trap member 34 is radially-inwardly spaced from the perimeter of the first wall 36 thereby defining a radially-extending annular flange portion 70 of the first wall 36. This flange portion 70 is useful in mounting the outer trap member 34 in the circular side wall opening 24, as will now be described.

The trap 20 may be mounted either in a fully or partially assembled state. In both cases, the outer trap member 34 is pushed into the circular side wall opening 24 from outside the catch basin 28 until the annular flange portion 70 engages an outer surface 72 of the catch basin side wall 26 about the opening 24. The outer connecting wall 54 has first and second cylindrical portions 54a, 54b integrally connected co-axially in series (best seen in FIGS. 3 and 6) with the first cylindrical portion 54a being integrally connected to the first wall 36 and the second cylindrical portion 54b being integrally connected to the first cylindrical portion and having an outer diameter smaller than the outer diameter of the first cylindrical portion 54a so as to define a first annular abutment wall 54c at the junction of the first and second cylindrical portions 54a, 54b. Thus, an annular sealing member in the form of an annular rubber gasket 71 may be mounted over the second cylindrical portion 54b in abutment with the first annular abutment wall 54c to provide a seal between the outer trap member 34 and the side wall opening 24 when the outer connecting wall 54 is pushed into the opening 24.

To better secure the trap 20 in place, the annular flange portion 70 is provided with three equi-angularly spaced attachment openings 73 (FIG. 4) through which affixing members such as bolts may be inserted to fixedly attach the outer trap member 34 to the side wall 26.

Other components, namely the inner trap member 44, filter assembly 50, and foam sealing member 78 may or may not be assembled with the outer trap member 34 when the outer trap member 34 is mounted in the side wall 26. It will be appreciated that these components may be added after the outer trap member 34 is mounted to the side wall, from inside the catch basin. Conversely, the trap 20 may be mounted in a fully assembled state and the other components may be removed later.

To facilitate attachment to the pipe 40, the outer trap member 34 has a cylindrical pipe connector 82 integrally formed with and extending perpendicularly away from an outer surface 84 of the first wall 36 for slidably receiving an end of the outlet pipe 40 therearound. The pipe connector 82 has coaxial first and second cylindrical connector portions 82a, 82b connected in series, said second connector portion 82b being integrally connected to said first wall 36, said first connector portion 82a being integrally connected to said second connector portion 82b and having an outer diameter smaller than the outer diameter of the second connector portion 82b so as to define a second annular abutment wall 82c at the junction of the first and second connector portions 82a, 82b. An annular sealing member in the form of a second annular rubber gasket 88 is fit around the first connector portion 82a in abutment with said second annular abutment wall 82c to provide a liquid tight seal between the pipe connector 82 and the outlet pipe 40.

As mentioned above, the filter assembly 50 is for capturing matter entrained in drainage water exiting the catch basin through the trap 20 and will now be described with reference mainly to FIGS. 3, 4 and 6. With reference to FIGS. 3 and 4, the filter assembly 50 includes a plastic mounting member 90 having a mounting ring 92, with a stepped cylindrical first portion 92a and a second portion 92b extending radially outwardly relative to the first portion 92a and engageable with an inner side of the second connector portion 82b when the mounting ring is inserted in the outlet opening 38. The filter bag 52 has an open end portion 100 sewn to the first portion 92a of the mounting ring 92.

The mounting member 90 further has two similar opposed filter handles 94 each having opposite end portions integrally formed with the second portion 92b and extending generally transversely away from the second portion 92b. The filter handles 94 define openings 96 between the filter handles 94 and the second portion 92b which permit a user to mount or remove the filter assembly 50 to or from the outer trap member 34 from outside the catch basin using a suitable tool. A suitable tool would be rigid and have a suitably elongated body with a gripping portion at one end to be held by a user, and a pair of inserts at an opposite end, sized, shaped and configured to fit through the openings 96 and engage the handles 94, whereby the filter assembly 50 may be mounted to the trap 20 or removed therefrom from outside the catch basin 28.

The filter assembly 50 is mounted to the trap by pushing the first the mounting ring 92 into the outlet opening 38 of the outer trap member 34 from an inner side thereof When mounted, a dosed end portion 98 of the filter bag 52, opposed to the open end portion 100, is disposed downstream of the outlet opening 38. The second portion 92b of the mounting ring 90 is dimensioned to frictionally fit within the cylindrical pipe connector 82.

It will be appreciated that there may be more than one filter bag 52 and that each filter bag may be made of different materials, shapes, sizes and specifications. For example, FIG. 6 illustrates a filter assembly 50a having two filter bags 52, 102 sewn to the mounting ring 92. The first filter bag 52, as mentioned above, is made of interwoven polyester fibre combined with a woven polyester scrim, and has an effective pore size of about 110 microns to filter particles such as sand. The second filter bag 102 is made of polypropylene material suitable for capturing oils passing through the first filter bag 52.

As mentioned above, the inner trap member 44 and filter assembly 50 are removable to provide a trap 20 which is highly versatile. A trap 20 consisting only of outer and inner trap members 34, 44 and having an inlet opening sized, shaped, and configured to restrict water flow, is effective in removing relatively large sediments (e.g. sand) from drainage water. The filter assembly 50 is employed to remove finer sediments such as silt or clay or non-settling pollutants such as hydrocarbons, heavy metals, bacteria, and nutrients. In circumstances where a trap is no longer required, the filter assembly 50 and inner trap member may be simply removed.

The inner trap member 44 may be manufactured and sold with a pre-formed inlet opening 32. However, the inner trap member 44 may also be manufactured and sold with an unapertured or closed second wall 46 to provide an assembly convertible into a trap when the inlet opening 32 is provided in the second wall 46. To facilitate provision of the inlet opening 32 the preferred embodiment includes circular cutting guides 104 for use in cutting an inlet opening suitably sized for the particular application (see FIG. 5). The diameters of the circular cutting guides are as follows: 5.1 cm, 7.6 cm, 10.2 cm, and 12.7 cm. These diameters are for use with 10 inch (about 25.4 cm) outlet pipes. The size of the inlet opening 32 will be selected based upon a number of factors including the diameter of the outlet pipe, the number of side wall openings 24 and traps 20 installed per catch basin 28, the size of the catch basin, and also on the number of catch basins 28 installed in a specified geographical area. In general, assuming the catch basin has a single side wall opening with one trap 20 installed therein, the circular inlet opening of the trap 20 should not exceed one half the diameter of the outlet pipe.

In the preferred embodiment, the trap members 34, 44 are each of a unitary construction and are formed by injection molding using high density polyethylene. As part of the molding process, an annular groove 106 is formed in the outer surface 84 of the first wall 36 of the outer trap member 34, (see FIG. 4). The annular groove 106 prevents warping of the outer trap member 34 when it is cooled after extrusion. Apart from this, the annular groove 106 serves no particular function in the trap 20.

It will be appreciated that many variations may be made to the preferred embodiment without departing from the scope of the invention as claimed below. For example, the filter member may take various forms other than a bag. What is required is that the filter member be disposed in the water flow path to capture matter flowing along the path. Thus, the filter member may be attached to either of the inner and outer trap members provided this purpose is achieved. The filter bag 52 may be manufactured to have different pore sizes depending on what matter is targeted for removal. For example, a pore size of about 20 microns is suitable for filtering clay, while a pore size of about 75 microns is effective in filtering silt. Similarly, the material of the filter bag may be varied to capture different types of matter, such as bacteria, heavy metals and nutrients. In filter assemblies having more than one filter member, one filter member will be selected to remove matter not removed by an adjacent filter member upstream thereof. Additional filter materials such as activated charcoal may be added in between filter members to capture additional pollutants.

The inlet opening of the inner trap member need not be circular but may take other shapes such as square, rectangular, oval, etc. Depending on the shape selected, the cross-sectional area of the inlet opening may be varied within certain parameters to achieve the desired water flow rates, as can be readily determined through simple experimentation.

For the sake clarity, throughout the description and claims, the term "matter" is used to mean one or more of those substances found in drainage water the removal of which is desirable. These substances include particulate matter such as sand, debris, leaves, clay and silt, liquid matter including hydrocarbon fuels (e.g. oil and gasoline), and dissolved matter such as bacteria, nutrients and heavy metals.

I claim:

1. An assembly for mounting in a side wall opening of a catch basin side wall and convertible into a trap for reducing the amount of matter being carried out of the catch basin by drainage water exiting the catch basin, said assembly being sealingly attachable across said side wall opening and comprising:

a first trap member having a first wall and en outlet opening formed in said first wall, said first trap member being sealingly attachable to an outlet pipe with said outlet opening in communication with the interior of the pipe;

a second trap member releasably end sealingly engageable with said first trap member and having a second wall spaced from said first well when so attached; and a filter assembly releasably attachable to one of said first and second trap members, said filter assembly having a mounting ring and a filter bag made to capture matter entrained in drainage water, said filter bag having an open end portion connected to said mounting ring, said mounting ring being releasably attachable to one of said first end second trap members so that said mounting ring is inside the assembly for mounting in the side wall opening during use of the filter assembly;

wherein, when the assembly is assembled, mounted in said side wall opening, and converted into a trap by providing an inlet opening in said second wall at a position below said outlet opening, there is defined a water flow path extending from the catch basin interior, through said inlet opening and then through said outlet opening, and said filter bag is positioned across said water flow path to capture matter entrained in drainage water flowing along said path, said filter assembly is positioned outside of a water containing chamber formed in said catch basin, and said filter bag is disposed downstream of aid outlet opening.

2. An assembly according to claim 1 in which said second wall is provided with cutting guides for use in cutting said inlet opening.

3. An assembly according to claim 1 converted into a trap, the assembly having an inlet opening provided in said second wall for communicating with the interior of the catch basin and sized, shaped and configured to restrict water flow through the assembly to promote settlement of matter in the catch basin.

4. An assembly according to clam 3 in which said inlet opening is circular and has a diameter up to one half of the diameter of an outlet pipe to be attached to the assembly.

5. An assembly according to claim 1 comprising a cylindrical pipe connector rigidly coupled to and extending away from an outer surface of the first wall for slidably receiving an end of the outer pipe therearound.

6. An assembly according to claim 5 in which said pipe connector has coaxial first and second cylindrical connector portions connected in series, said second connector portion being connected to said first wall, said first connector portion having an outer diameter smaller than the outer diameter of the second connector portion so as to define a second annular abutment wall at the junction of the first and second connector portions, whereby an annular sealing member may be fit around the first connector portion in abutment with said second annular abutment wall to provide a seal between the pipe connector and an outlet pipe to be slidably mounted over the pipe connector.

7. An assembly according to claim 1 in which said second wall is indented on an outer surface thereof to provide a pair of handles, each handle having a pair of opposed bearing surfaces extending generally transversely relative to said second wail, said handles permitting a user to assemble or disassemble the first and second trap members from outside the catch basin using a suitable implement.

8. An assembly for mounting in a side wall opening of a catch basin side wall and convertible into a trap for reducing the amount of mailer being carried out of the catch basin by drainage water exiting the catch basin, said assembly being sealingly attachable across said side wall opening and comprising:
    a first trap member having a first wall and an outlet opening formed in said first wall, said first trap member being sealingly attachable said outlet opening in communication with the interior of the pipe;
    a second trap member releasably and sealingly engageable with said first trap member and having a second wall spaced from said first wall when so attached; and
    a filter assembly releasably, attachable to said first trap member, said filter assembly having a mounting ring and a filter member made to capture matter entrained in drainage water, said filter member having an open end and an opposite closed end and being connected at said open end to said mounting ring which is releasably attachable to said first trap member so that the mounting ring is inside the assembly during use of the filter assembly;
    wherein, when the assembly is assembled, mounted in said side wall opening, and converted into a trap by providing an inlet opening in said second wall at a position below said outlet opening, there is defined a water flow path extending from the catch basin interior, through said inlet opening and then through said outlet opening, and said filter member is positioned across said water flow path to capture matter entrained in drainage water flowing alone said path.

9. An assembly according to claim 8 in which said first and second walls are circular and said assembly is dimensioned to be sealingly attachable across a circular side wall opening in a catch basin side wall.

10. An assembly according to claim 9 comprising first and second cylindrical connecting walls rigidly coupled to and extending away from inner sides of the first and second walls, respectively, said first and second connecting wails being mutually releasably engageable with each other.

11. An assembly according to claim 10 in which one of said connecting walls is dimensioned to fit inside the other of said connecting walls and has a plurality or pins angularly spaced and extending radially outwardly from an outer surface thereof, and the other of said connecting walls has an equal number of similarly angularly-spaced curved slots formed in a free end thereof for receiving said pins in a bayonet fit.

12. An assembly according to claim 11 wherein said second connecting well is dimensioned to fit inside said first connecting wall and has said pins, the first connecting wall having said slots, said first trap member has a cylindrical sealing wall rigidly coupled to and extending away from the inner surface of the first wall, said sealing wall being positioned radially inwardly from said first connecting wail so as to define an annular groove between said sealing wall and said first connecting wall, the annular groove being dimensioned to receive an annular sealing member and a free end of said second connecting wall to form a seal between said first and second trap members when said first and second trap members are assembled together.

13. An assembly according to claim 12 wherein said first connecting wall has first and second cylindrical portions connected co-axially in series, said first cylindrical portion being connected to said first wall, said second cylindrical portion having an outer diameter smaller then the outer diameter of the first cylindrical portion so as to define a first annular abutment wail at the junction of the first and second cylindrical portions, whereby en annular sealing member may be mounted over the second cylindrical portion in abutment with said first annular abutment wall to provide a seal between the first trap member and the side wail opening.

14. An assembly according to claim 10 in which the second connecting wall is sized and positioned to extend from the perimeter of the second wall.

15. An assembly according to claim 10 in which the first connecting wall is sized and positioned to be radially-inwardly spaced from the perimeter of the first wall thereby defining a radially-extending annular flange portion of said first wall for engaging an outer surface of a catch basin side wall about an opening in the side wall.

16. An assembly for mounting in a side wall opening of a catch basin side wall convertible into a trap for reducing the amount of matter being carried out of the catch basin by drainage water exiting the catch basin, said assembly being sealingly attachable across said side wall opening and comprising:
    a first trap member having a first wall and an outlet opening formed in said first wall, said first trap member being sealingly attachable to an outlet pipe with said outlet opening in communication with the interior of the pipe;
    a second trap member releasably and sealingly engageable with said first trap member and having a second wall spaced from said first wall when so attached; and
    a filter assembly releasably attachable to said first trap member, said filter assembly having a filter member made to capture matter entrained in drainage water and having an open end and an opposite closed end and a mounting member to which said open end of said filter member is attached, said mounting member having a first portion and a second portion extending radially-outwardly relative to said first portion, said first and second portions being sized and shaped to be insertable in said outlet opening and said second portion being engageable with an inner surface of the first trap member when the first and second portions are inserted in the outlet opening.

17. An assembly according to claim 16 in which said filter member is in the form of a bag, said open end being attached to said first portion of said mounting member.

18. An assembly according to claim 16 which said mounting member comprises at least one filter handle having opposite ends connected to said second portion of the mounting member to define an opening between the filter handle end the second portion, said filter handle permitting a user to mount or remove the filter assembly to or from the first trap member from outside the catch basin using a suitable implement.

19. An assembly according to claim 18 wherein said mounting member comprises two of said handles connected to said second portion in spaced relationship.

20. A method of capturing matter entrained in drainage water exiting from a catch basin into an outlet pipe through a side wall opening in the catch basin comprising:

providing a trap that includes an outer trap member having a first wall and an outlet opening formed in said first wall, an inner trap member releasably engaged with said outer trap member, and having a second wall defining an inlet opening, and a filter member having an open end and an opposite closed end; and mounting said trap in said side wall opening so that said outer trap member is attached to said outlet pipe and coupling said open and of said filter member releasably to an inner surface of said outer trap member downstream of the side wall opening, the filter member being made to remove matter from drainage water flowing through the filter member.

* * * * *

UNITED STATES PATENT AND TRADEMARK OFFICE
CERTIFICATE OF CORRECTION

PATENT NO. : 6,749,746 B2
DATED : June 15, 2004
INVENTOR(S) : Mokrzycki

It is certified that error appears in the above-identified patent and that said Letters Patent is hereby corrected as shown below:

Column 8,
Line 30, "en" should be -- an --;
Line 35, "end" should be -- and --;
Line 37, "well" should be -- wall --;
Line 44, "end" should be -- and --;
Line 58, "aid" should be -- said --;

Column 9,
Line 1, "clam" should be -- claim --;
Line 28, "mailer" should be -- matter --;
Line 34, after "attachable" the words -- to an outlet pipe with -- are missing before "said";
Line 56, "alone" should be -- along --;
Line 61, "end" should be -- and --;
Line 64, "wails" should be -- walls --;

Column 10,
Line 1, "or" should be -- of --;
Line 8, "well" should be -- wall --;
Line 13, "wail" should be -- wall --;
Line 23, "then" should be -- than --;
Line 25, "wail" should be -- wall --;
Line 26, "en" should be -- an --;
Line 29, "wail" should be -- wall --;

Column 11,
Line 5, "end" should be -- and --;

UNITED STATES PATENT AND TRADEMARK OFFICE
CERTIFICATE OF CORRECTION

PATENT NO. : 6,749,746 B2
DATED : June 15, 2004
INVENTOR(S) : Mokrzycki

It is certified that error appears in the above-identified patent and that said Letters Patent is hereby corrected as shown below:

Column 12,
Line 9, "and" should be -- end --.

Signed and Sealed this

Twenty-second Day of February, 2005

JON W. DUDAS
*Director of the United States Patent and Trademark Office*